Figure 1:
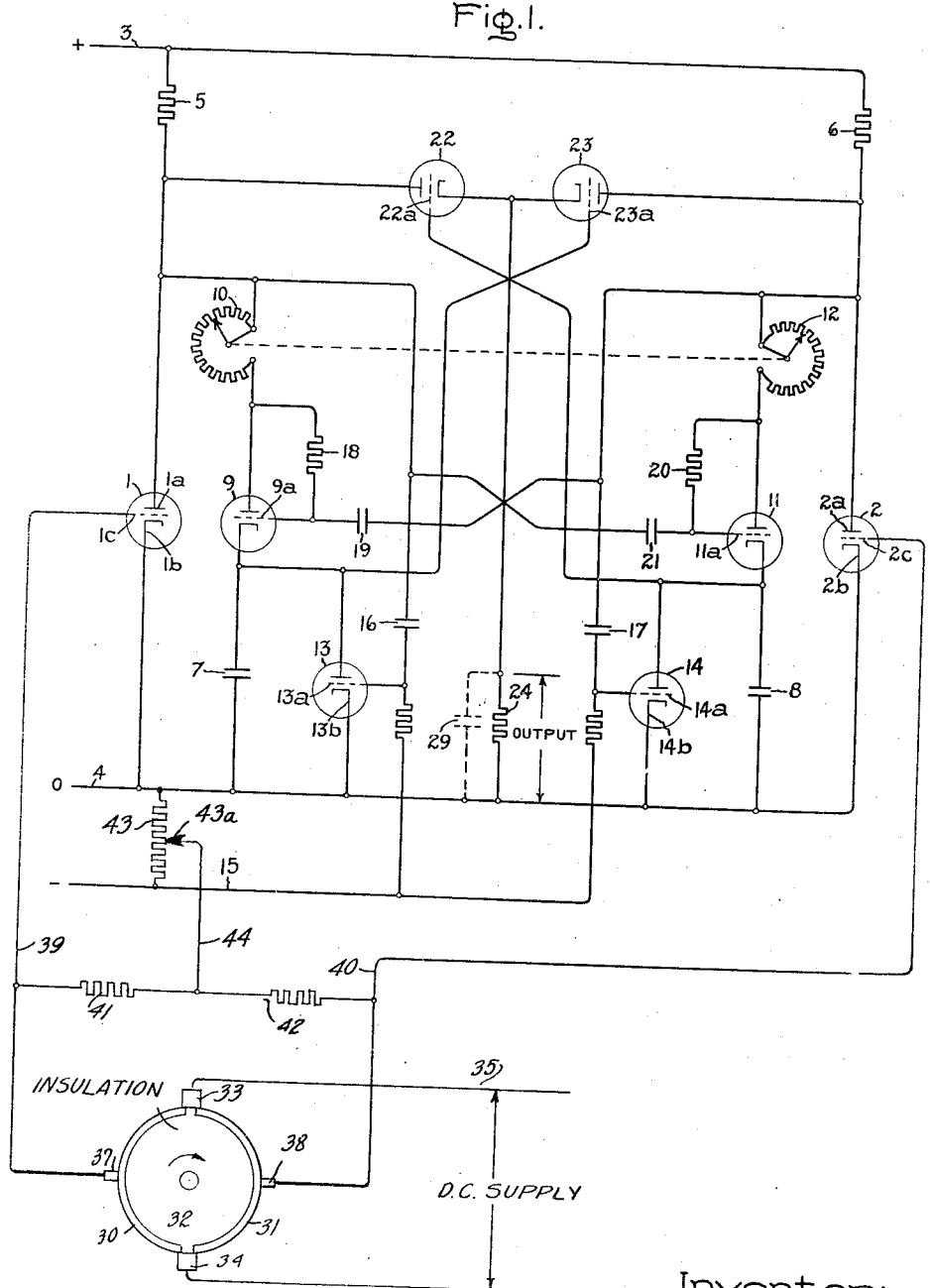

Jan. 10, 1950           G. L. ROGERS           2,494,357

FREQUENCY RESPONSIVE CONTROL SYSTEM

Filed May 25, 1946           2 Sheets-Sheet 1

Inventor:
George L. Rogers,
by His Attorney.

Jan. 10, 1950     G. L. ROGERS     2,494,357
FREQUENCY RESPONSIVE CONTROL SYSTEM
Filed May 25, 1946     2 Sheets-Sheet 2

Inventor:
George L. Rogers,
by Claude A. Nitt.
His Attorney.

Patented Jan. 10, 1950

2,494,357

UNITED STATES PATENT OFFICE 2,494,357

FREQUENCY RESPONSIVE CONTROL SYSTEM

George L. Rogers, Schenectady, N. Y., assignor to General Electric Company, a corporation of New York Application May 25, 1946, Serial No. 672,218

5 Claims. (Cl. 250—27)

This invention relates to control systems, more particularly to systems for providing signal voltages having predetermined relationships to variable quantities.

In controlling or regulating operating characteristics of machines, such for example as the speed of a motor, a D.-C. signal voltage is frequently required which is responsive to speed or frequency. Heretofore such signal voltages have been obtained by utilizing the output of a D.-C. tachometer generator driven by the machine of which it is desired to obtain an indication of its speed. In the case of a D.-C. motor, the armature voltage has been used as an indication of its speed. Such D.-C. signal voltages have also been obtained by utilizing A.-C. tachometer generators together with rectifiers and filters. In the first two of the foregoing alternatives, accuracy is impaired by variable brush drops. The third alternative requires filters capable of removing the ripple from the rectified voltage at minimum frequency. Consequently, when operating at higher frequencies such filters introduce relatively long time delays which result in sluggish operation of the system.

Accordingly, a further object of the invention is the provision of a control system which produces a direct output voltage of which the magnitude is dependent on the frequency of an input signal voltage and which is not affected by the magnitude of the input signal; which corrects the output each half cycle of the input signal; which maintains essentially a constant reference level of the output signal as the reference frequency is changed, and which produces an output signal that varies a constant amount for a given percentage variation in input signal voltage frequency at all input levels of frequency of the input voltage.

In carrying the invention into effect in one form thereof, means are provided for producing two dephased square wave voltages. Each of a pair of capacitors is connected to be charged during one half cycle of a corresponding one of the square wave voltages and to have its charge maintained during the succeeding half cycle. At the end of each half cycle which succeeds the charging half cycle, each of the capacitors is rapidly discharged and the operating cycle is repeated. Since the charge on the capacitors is proportional to the charging time, i. e. one half cycle, the charge is dependent on the frequency of the square wave voltage. A voltage drop device is connected in the cathode circuit of a pair of electric valves to provide cathode follower operation, and the voltage across the charged capacitors is utilized to control these electric valves to maintain a current flow such that the voltage drop across the voltage drop device will be proportional to the charge on the capacitors which, as pointed out in the foregoing, is dependent on the frequency of the square wave voltage.

Figure 2:
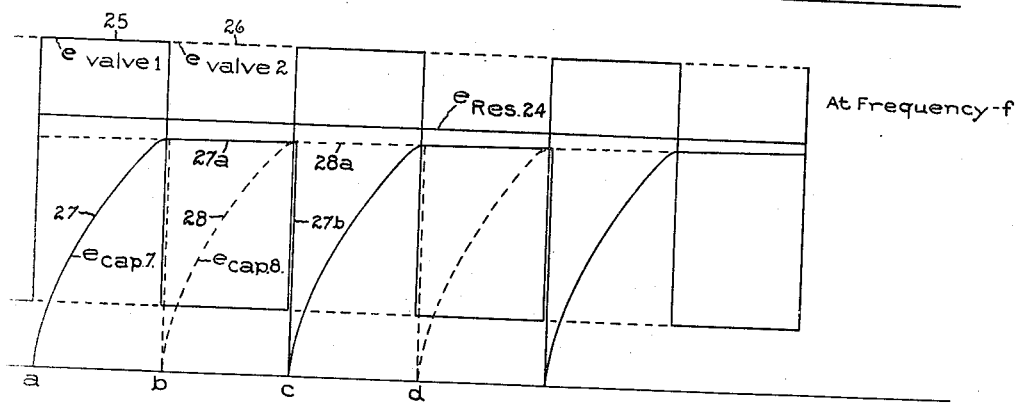
Figure 3:
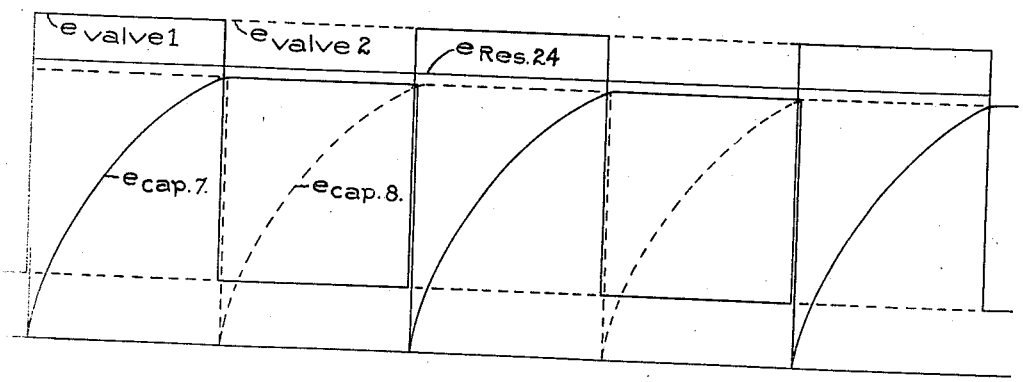

For a better and more complete understanding of the invention, reference should now be had to the following specification and to the accompanying drawing of which Fig. 1 is a simple, diagrammatical illustration of an embodiment of the invention, and Figs. 2 and 3 are charts of characteristic curves which facilitate an understanding of the invention.

Referring now to the drawing, a pair of electric valves 1 and 2 are connected across a source of direct voltage which is represented by the supply lines 3 and 4. Although these valves may be of any suitable type they are preferably high vacuum triode valves and have anodes 1a and 2a, cathodes 1b and 2b, and control grids 1c and 2c, respectively. In series with the valves 1 and 2 are connected suitable voltage drop devices such as resistors 5 and 6.

The valves 1 and 2 constitute the output stage of a square wave generator (not shown) which produces across resistors 5 and 6 square waves of voltage which are synchronized with the frequency of the input signal to the square wave generator. Inverse phase square wave voltages appear across the valves 1 and 2. These square waves vary only in width, i. e. in period as the frequency of the input signal voltage varies.

A pair of capacitors 7 and 8 are provided which are arranged to be charged during alternate half cycles of the square wave voltages which appear across the valves 1 and 2. For this purpose the charging circuit of the capacitor 7 is connected across the valve 1 and the charging circuit of the capacitor 8 is connected across the valve 2. The charging circuit for the capacitor 7 includes a triode valve 9 and a rheostat 10 for adjusting the rate of charge. Similarly, the charging circuit for the capacitor 8 includes a triode valve 11 and a charging rate adjusting rheostat 12.

Each of the capacitors 7 and 8 is provided with a discharge circuit. A triode valve 13 which is connected across the capacitor 7 constitutes its discharge circuit and similarly a triode valve 14 which is connected across the capacitor 8 constitutes its discharge circuit. The control grids 13a and 14a of the discharge circuit valves are connected to a conductor 15 of which the voltage is so negative with respect to the voltage of conductor 4 to which the cathodes 13b and 14b are connected that the valves 13 and 14 are normally biased to cut-off. A capacitor 16 is connected between the grid 13a of the valve 13 and the anode 1a of valve 1. Similarly, a capacitor 17 is connected between the grid 14a of valve 14 and the anode 2a of valve 2.

The grid 9a of the charging circuit valve 9 is connected through a resistor 18 to its anode and is also connected through a capacitor 19 to the anode 2a of valve 2. Similarly, the grid 11a of the charging circuit valve 11 is connected through a resistor 20 to its anode and is also connected through a capacitor 21 to the anode 1a of valve 1.

A triode electric valve 22 is included in a parallel circuit across the valve 1 and likewise a similar electric valve 23 is connected in a parallel circuit across the valve 2. The grid 23a of valve 23 is connected to the cathode of the valve 9 and thus the grid cathode circuit of valve 23 is connected across the capacitor 7. Similarly, the grid 22a of valve 22 is connected to the cathode of valve 11 and thus the grid cathode circuit of valve 22 is connected across the capacitor 8. Cathode follower operation of the valves 22 and 23 is provided by means of a voltage drop device such as the resistor 24 which is connected in series between the cathodes of valves 22 and 23 and the negative conductor 4. For the purpose of supplying a square wave alternating voltage to the grids 1c and 2c of output valves 1 and 2, a commutator device is provided. It comprises two semi-circular conducting segments 30 and 31 mounted on an insulating disc 32 so that the two segments 30 and 31 are separated from each other by insulation.

The disc is driven at a speed which is substantially constant by any suitable driving means such as an induction motor (not shown).

As shown, the device is provided with two brushes 33 and 34 to which a direct voltage is supplied from a suitable source which is represented by the two supply lines 35 and 36. The commutator is further provided with a pair of output brushes 37 and 38 which are mounted in quadrature with the input brushes. The brush 37 is connected by means of conductor 39 to the grid 1c of valve 1 and the brush 38 is connected by means of conductor 40 to the grid 2c of valve 2.

Across the conductors 39 and 40 are connected two resistors 41 and 42 of substantially equal resistance. To the junction point of the two resistors is supplied a negative bias voltage from a suitable source such as the potentiometer 39 which is connected across the conductors 4 and 15. A conductor 44 connects the junction point of resistors 41 and 42 to the slider 39a of the potentiometer 39.

The voltage of the D.-C. supply 35—36 and the voltage of the bias supplied to conductor 44 are of such values as alternately to drive valves 1 and 2 to saturation and cutoff as the commutator rotates and reverses the voltage applied to the grids 1c and 2c.

With the foregoing understanding of the elements and their organization, the operation will readily be understood from the following description.

As shown in the characteristic curves of Fig. 2, the voltage across tube 1 is represented by the solid line square wave 25 and the voltage across the valve 2 is represented by the dotted line square wave 26. Similarly, the voltage across the capacitor 7 is represented by the solid line curve 27 and the voltage across the capacitor 8 is represented by the dotted line curve 28.

Beginning at the point a, when the valve 1 ceases to conduct, the sudden rise in voltage through the capacitor 16 across the valve applies a positive impulse of voltage to the grid 13a of valve 13, since the capacitor cannot charge instantaneously. This renders the valve 13 conducting for a brief fraction of a second which is sufficient to discharge the capacitor 7. At the same time valve 2 begins to conduct, and the resulting sudden decrease in voltage across the valve 2 applies a negative impulse through the capacitor 19 to the grid 9a of valve 9. This momentarily renders the valve 9 non-conducting, thereby momentarily interrupting the charging current which flows through the rheostat 10 to the capacitor 7.

The time constants of the grid circuits of the valves 9 and 13 are relatively short in comparison to the operating frequency. As soon as the impulses supplied to the grids 9a and 13a have passed, the grid 13a resumes the normal negative bias of the conductor 15, thereby biasing the valve 13 to cut-off. Likewise, as the capacitor 19 attains full charge, the voltage of the grid 9a of valve 9 becomes equal to the voltage of its anode and the valve 9 returns to a conducting condition. In response to the restoration of conduction through valve 9, the capacitor 7 charges at a rate that is determined by the time constant of the rheostat 10-capacitor 7 combination until the end of the half cycle a—b during which the valve 1 is cut off. At the end of this half cycle, i. e. at the point b, the voltage across the capacitor 7 has risen to a predetermined proportion of the supply voltage determined by the resistance 10-capacitor 7 time constant and the period, i. e. the time length of the half cycle a—b. This point in the operation is illustrated in Fig. 2 by the rising portion of the curve 27 between the points a and b.

At the end of this half cycle, i. e. at point b, the valve 1 becomes conducting and the valve 2 is cut off. Conduction by the valve 1 produces a voltage drop across the resistor 5 which reduces the voltage drop across the valve 1 to a value that is less than the voltage across the capacitor 7. Consequently, the rectifying property of valve 9 whose anode is connected through the rheostat 10 of the anode 1a of valve 1 terminates the charging of capacitor 7. The valve 13 is still biased to cut-off and there is therefore no discharge path for the capacitor 7 except through the grid of valve 23. During the following half cycle, i. e. between the points b and c, the valve 23 acts as a cathode follower to maintain across the resistor 24 a voltage which is determined by the voltage across the capacitor 7. During this half cycle, the valve 22 has no effect on the voltage across resistor 24, since owing to the voltage drop across resistor 5 its anode is more negative than its cathode and it does not conduct.

Since there is no discharge path for the capacitor 7 except leakage and grid currents which are extremely minute, this capacitor maintains essentially a constant voltage across resistor 24 during the half cycle b—c. Thus the voltage across the resistor 24 is represented in Fig. 2 by the horizontal portion 27a of the curve 27 between the points b and c.

At the end of this half cycle, i. e. at point c, the valve 2 again conducts and the valve 1 is cut off. Consequently, capacitor 7 is discharged as represented by the vertical portion 27b of the curve 27, and the cycle described in the foregoing is repeated.

In a similar manner, the capacitor 8 is charged and discharged to maintain a voltage across the resistor 24 during those half cycles in which the capacitor 7 is being charged. The rise of voltage across the capacitor 8 as it is being charged is represented in Fig. 2 by the portion of the curve 28 between points $b$ and $c$, and its voltage during the half cycle in which capacitor 7 is discharged and recharged is represented by the horizontal portion 28a of curve 28. During the half cycle $c—d$ in which the voltage across the capacitor 8 remains substantially constant, the valve 22 operates as a cathode follower to maintain a voltage drop across the resistor 24 which is proportional to the charge on the capacitor, i. e. the voltage across the capacitor 8.

Assuming that all elements in the two sections of the control system are symmetrical, i. e. electrically balanced, the voltages maintained across the resistor 24 during the successive half cycles are the same and a direct voltage output is therefore obtained. There is a possibility of some disturbance to this voltage as control is transferred between capacitors 7 and 8. However, this disturbance is at a relatively high frequency and may be filtered by a small capacitor 29 without introducing time delays of sufficient length to be detrimental.

With given settings of the rheostats 10 and 12, the voltage across resistor 24 during any half cycle is determined by the length (or frequency) of the next preceding half cycle. That is to say, the voltage which is maintained across the resistor 24 between the points $c$ and $d$, for example, is determined by the voltage to which the capacitor 8 is charged during the half cycle $b—c$ which in turn depends upon the length of the half cycle $b—c$. Thus, any change in the input frequency of the square wave generator produces a corresponding change in the magnitude of the output voltage across the resistor 24 on the next succeeding half cycle.

Fig. 3 shows the effect of a decrease in the frequency of the voltage of the square wave generator. Capacitors 7 and 8 have longer charging periods and consequently are charged to a higher voltage. Consequently a higher voltage is held across the resistor 24.

The setting of the rheostats 10 and 12 determines the output voltage at a fixed frequency or, conversely, it determines the frequency for a given output voltage. By setting the rheostats 10 and 12 so that the time constants of the R. C. combinations of the rheostats 10 and 12 and the capacitors 7 and 8 are equal to the period of one half cycle, maximum slope of the charging curve is obtained. This slope is constant in terms of per cent frequency change versus output voltage, and a constant ratio of output voltage to per cent input frequency change is obtained.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A control system comprising in combination, first and second sources of square wave alternating voltages substantially in phase opposition, first and second capacitors, means for charging each of said capacitors during one half cycle of a corresponding one of said voltages to a value dependent upon the frequency and for discharging each of said capacitors at the end of a succeeding half cycle comprising a separate charging circuit for each of said capacitors supplied from a corresponding one of said sources and a separate discharge circuit for each of said capacitors, each of said charging and discharge circuits including an electric valve provided with an anode, a cathode and a control grid, connections from the control grid and cathode of each of said valves to the terminals of its associated source of square wave voltage and additional connections from the control grid and cathode of each of said charging circuit valves to the terminals of the other of said sources, a voltage drop device, an additional source of voltage, and electric valve means supplied from said additional source and responsive to the charges on said capacitors for maintaining a current through said voltage drop device proportional to said charges.

2. A control system comprising in combination, first and second sources of square wave alternating voltages substantially in phase opposition, first and second capacitors, means for charging each of said capacitors during one half cycle of a corresponding one of said voltages to a value dependent upon the frequency and for discharging each of said capacitors at the end of a succeeding half cycle comprising a separate charging circuit for each of said capacitors supplied from a corresponding one of said sources and a separate discharge circuit for each of said capacitors, each of said charging and discharge circuits including an electric valve provided with an anode, a cathode and a control grid, connections from the control grid and cathode of each of said valves to the terminals of its associated source of square wave voltage and additional connections from the control grid and cathode of each of said charging circuit valves to the terminals of the other of said sources, a voltage drop device, a source of direct voltage, and means for maintaining a voltage drop across said voltage drop device proportional to said charges on said capacitors comprising a pair of electric valves each having an anode connected to the positive side of said direct voltage source, a cathode connected through said voltage drop device to the other side of said direct voltage source and connections from each of said capacitors to the control grid of a corresponding one of said pair of valves.

3. A control system comprising in combination, first and second sources of square wave alternating voltages substantially in phase opposition, first and second capacitors, means for charging each of said capacitors during one half cycle of a corresponding one of said voltages to a value dependent upon the frequency and for discharging each of said capacitors at the end of a succeeding half cycle comprising a separate charging circuit for each of said capacitors supplied from a corresponding one of said sources and a separate discharge circuit for each of said capacitors, each of said charging and discharge circuits including an electric valve provided with an anode, a cathode and a control grid, connections from the grid and cathode of each of said valves to the terminals of its associated source of square wave voltage, a capacitor in each of the connections between the grid of each discharge circuit valve and its associated source, an additional connection including a capacitor between the grid of each of said charging circuit valves and one terminal of the other of said sources and a connection between the cathode and the other terminal of said other source, a voltage drop device, a source of direct voltage, and means for maintaining a voltage drop across said voltage drop device proportional to said charges on said first and second capacitors comprising a pair of electric valves each having an anode connected to the positive side of said direct voltage source, a cathode connected through said voltage drop device to the other side of said direct voltage source and a connection from each of said first and second capacitors to the control grid of a corresponding one of said pair of valves.

4. A control system comprising in combination first and second voltage drop devices, means for producing square wave voltages in phase opposition across said devices, a pair of capacitors, a discharge circuit for each of said capacitors including an electric valve, a charging circuit for each of said capacitors including an electric valve, means responsive to the rise in voltage at the beginning of a half cycle of each of said voltages for momentarily rendering a corresponding discharge valve conducting to discharge a corresponding capacitor and means responsive to the simultaneous decrease of the other of said voltages for momentarily rendering the corresponding charging circuit valve non-conducting, means for rendering said charging circuit valves non-conducting at the end of said half cycles, a source of voltage, a third voltage drop device having one terminal connected to one side of said source, and means for maintaining a voltage drop across said third voltage drop device dependent on the frequency of said square wave voltages comprising a pair of electric valves connected between the other terminal of said third voltage drop device and the other side of said source for cathode follower operation, each of said valves having a control grid connected to be responsive to the voltage across a corresponding one of said capacitors.

5. A control system comprising in combination a first pair of electric valves, means for rendering said valves alternately conducting to produce square voltages in phase opposition, a pair of capacitors, a discharge circuit for each of said capacitors including an electric valve each provided with an anode, a cathode, and a control grid, a charging circuit for each of said capacitors including an electric valve each provided with an anode, a cathode, and a control grid, each of said charging circuit valves having an anode cathode circuit connected across a corresponding one of said first pair of valves and a grid cathode circuit connected across the other of said first pair of valves, means biasing said discharge circuit valves to cut-off, means responsive to the rise in voltage at the beginning of a half cycle of each of said square wave voltages for momentarily overcoming said biases to discharge a corresponding capacitor, connections from the anode and cathode of each of said charging circuit valves to the anode and cathode of each of said corresponding one of said first pair of valves to render each of said charging circuit valves non-conducting in response to the decrease in voltage across the corresponding one of said first valves at the end of said half cycles, a source of voltage, a voltage drop device having one terminal connected to one side of said source, and means for producing a voltage drop across said device dependent on the frequency of said square wave voltages comprising a pair of electric valves connected between the other terminal of said voltage drop device and the other side of said source for cathode follower operation, each of said last mentioned valves having a grid connected to be responsive to the voltage across a corresponding one of said capacitors.

GEORGE L. ROGERS.

REFERENCES CITED

The following references are of record in the file of this patent:

UNITED STATES PATENTS

| Number | Name | Date |
| --- | --- | --- |
| 2,119,389 | Hunt | May 31, 1938 |
| 2,176,742 | LaPierre | Oct. 17, 1939 |
| 2,392,632 | Berry | Jan. 8, 1946 |